June 9, 1931.  C. W. LOGAN  1,808,780
ARTIFICIAL COAL UNIT
Filed March 10, 1928

Inventor
Charles W. Logan
By Popp & Powers
Attorney

Patented June 9, 1931

1,808,780

UNITED STATES PATENT OFFICE

CHARLES W. LOGAN, OF KENMORE, NEW YORK, ASSIGNOR TO MARKEL ELECTRIC PRODUCTS, INC., OF BUFFALO, NEW YORK, A CORPORATION OF NEW YORK

ARTIFICIAL COAL UNIT

Application filed March 10, 1928. Serial No. 260,785.

This invention relates generally to imitation fire places and proposes an improved fuel unit which is intended to simulate coal burning in an open grate.

At the present time one practice largely followed in simulating burning coal is to place a loose mass of irregular pieces of glass upon a grate or other suitable framework. The burning effect is obtained by utilizing glass having a combination of appropriate colors and passing a light through the same. Ordinarily the color combination employed is red and black and it is generally obtained by the use of pieces of red glass having one face blackened. When such pieces are loosely thrown upon the grate, some of them will have their red faces uppermost while others will have their black faces uppermost.

I have found that the appearance or effect is greatly enhanced if the black faces are all maintained uppermost and the red faces lowermost and the object of this invention is, therefore, to provide a unit in which the black faces are so maintained.

The invention consists generally in an imitation fuel unit composed of a translucent base of glass or other suitable material and preferably of a red color and a layer of glass pieces of irregular shape and size and of the kind heretofore used, uniformly distributed upon the surface of said base and attached thereto as by transparent cement in positions in which the black faces of the glass are all uppermost and the red faces are lowermost whereby when the fire place is not in use a bed of unburned coal is simulated and when the fire place is in use a bed of burning coal is simulated, this effect being obtained by the red glow between and adjacent and perhaps to some extent through the glass pieces which is due to the coloring of the lower faces of said pieces and also in some measure to the coloring of the base and to the modification of this glow by the exposed black faces.

The unit is illustrated in the accompanying drawings, wherein.

Figure 1:
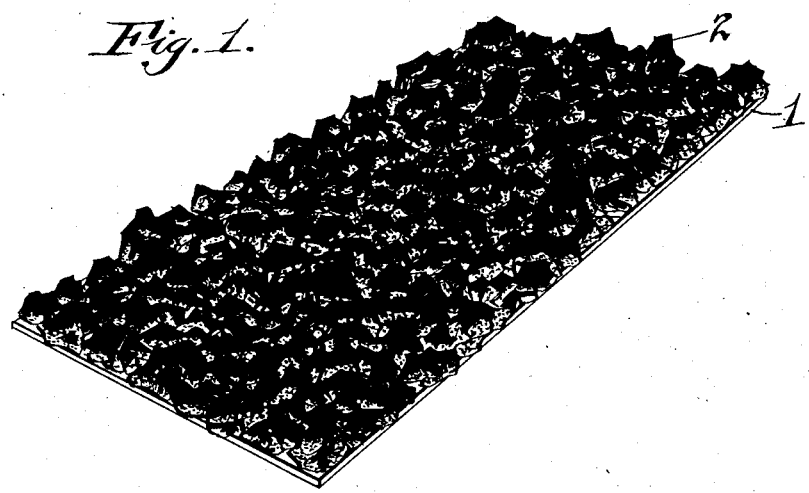
Figure 1 is a perspective view of the same.
Figure 2:
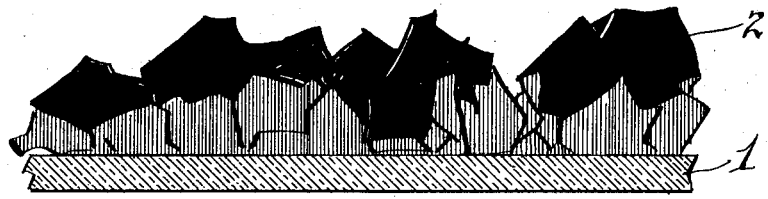
Figure 2 is a fragmentary cross sectional view thereof.

In constructing the unit, a plate 1 of translucent material such as glass is utilized as a base, said plate being preferably of a red color. The irregular glass pieces or pieces composed of any other suitable material and indicated at 2, are cemented to the plate 1 and to each other by means of a transparent cement such as silicate of soda (water glass). It is to be understood, of course, that the pieces 2 may be composed of translucent red glass or given a coating of any suitable translucent red material. The glass pieces may be blackened either before or after they are cemented to the base but in any case their blackened faces are limited to the exposed surface of the unit and are of such an extent as to have red spaces appearing between them, that is to say, spaces for the passage of the red or modified light.

By proceeding in this manner, a unit is produced which, when the heater is not in use, gives the desirable effect of a uniform bed of unburned coal the effect of the red coloring not being noticeably apparent and when illuminated, gives a far more realistic coal burning effect than can be obtained by the practice heretofore employed, wherein the arrangement of the red and black faces is altogether haphazard.

Having described my invention, I claim:—

1. A unit adapted to give a vari-colored effect when illuminated comprising a colored translucent base and varicolored pieces of partly blackened glass uniformly distributed throughout its surface and secured thereto in positions such that the exposed surfaces of the glass pieces include the blackened surfaces of said pieces.

2. A unit comprising a colored translucent base and pieces of partly blackened glass secured thereto in positions such that the blackened surfaces of said glass pieces are uniformly exposed.

3. A unit adapted when illuminated to simulate burning coal comprising a colored translucent base and irregular pieces of partly blackened glass cemented to one side thereof by means of a transparent cement in positions such that the exposed surfaces of the said pieces include the blackened surfaces of said pieces.

4. A unit adapted to simulate burning coal comprising a colored translucent base and pieces of partly blackened glass secured thereto in positions such that the blackened surfaces of said glass pieces are uniformly exposed in a manner such that when illuminated the light passing through the unblackened surfaces is modified red by virtue of said colored translucent base.

5. A unit adapted to simulate burning coal comprising a colored translucent base and pieces of partly blackened glass secured thereto in positions such that the blackened surfaces of said glass pieces are uniformly exposed, said base being colored in a manner such that when illuminated the light passing through the unblackened surfaces is modified red.

6. A unit adapted to simulate burning coal comprising a red translucent base and pieces of red translucent glass having partly blackened surfaces secured thereto in positions such that the blackened surfaces of said glass pieces are uniformly exposed whereby when the unit is illuminated the light through the unblackened surfaces is red.

In testimony whereof I hereby affix my signature.

CHARLES W. LOGAN.